H. O. V. BERGSTROM & O. FAGERLIND.
K. M. FAGERLIND (WIDOW) AND E. H. B. ALMGREN (GUARDIAN), REPRESENTATIVES OF
O. FAGERLIND, DEC'D.
METHOD OF PRODUCING METHYL ALCOHOL FROM WASTE PRODUCTS OF THE CAUSTIC SODA
CELLULOSE PROCESS.
APPLICATION FILED JULY 13, 1909.

1,032,982. Patented July 16, 1912.

Fig. 1.

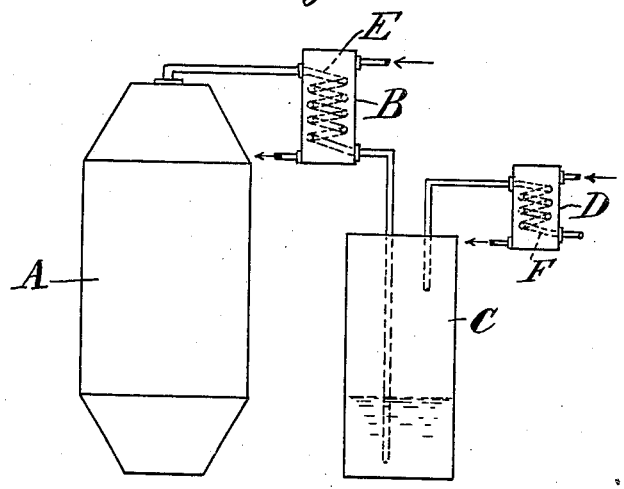

Fig. 2.

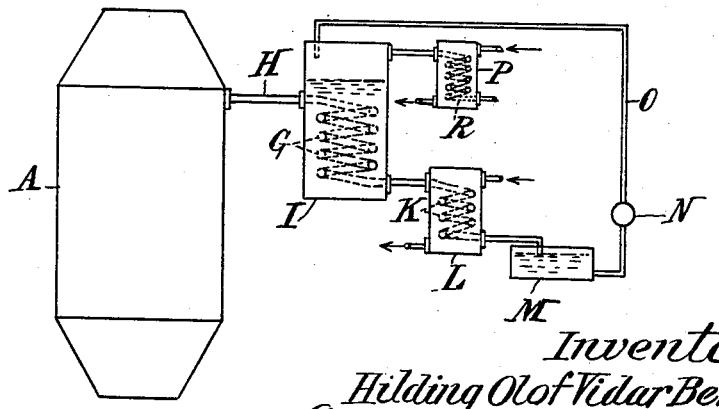

Witnesses:
J. W. Wiman
W. C. Lawson

Inventors
Hilding Olof Vidar Bergström,
and Oscar Fagerlind, deceased.
Kerstin Maria Fagerlind (widow)
and Erik Hjalmar Bertil Almgren,
(guardian) representatives of the
estate.
by
Attorney

UNITED STATES PATENT OFFICE.

HILDING OLOF VIDAR BERGSTRÖM, OF STOCKHOLM, SWEDEN, AND OSCAR FAGERLIND, DECEASED; KERSTIN MARIA FAGERLIND, (WIDOW,) AND ERIK HJALMAR BERTIL ALMGREN, (GUARDIAN,) REPRESENTATIVES OF THE ESTATE OF SAID OSCAR FAGERLIND, DECEASED.

METHOD OF PRODUCING METHYL ALCOHOL FROM WASTE PRODUCTS OF THE CAUSTIC-SODA-CELLULOSE PROCESS.

1,032,982.     Specification of Letters Patent.     Patented July 16, 1912.

Application filed July 13, 1909. Serial No. 507,415.

*To all whom it may concern:*

Be it known that I, HILDING OLOF VIDAR BERGSTRÖM, a subject of the King of Sweden, and resident of Norrtullsgatan 29, Stockholm, Sweden, and the deceased OSCAR FAGERLIND, late a subject of the King of Sweden, have invented certain new and useful Improvements in the Method of Producing Methyl Alcohol from Waste Products of the Caustic-Soda-Cellulose Process, of which the following is a specification.

In manufacturing cellulose by boiling wood with a lye the principal constituent of which is caustic soda, vapors are given off from the boiling lye, either when the pressure in the boiler is reduced during the boiling operation, or when the boiling lye is afterward evaporated. In some factories these vapors are condensed in surface condensers whereby a liquid of condensation is obtained which principally consists of water with sometimes an oil flowing on the surface of the same. In other factories these vapors are discharged into the atmospheric air. The water above referred to which contains bad-smelling products is generally discharged as water into a river or the like where this is permissible. Now, we have found that the above mentioned liquid of condensation contains valuable products in such great quantities that the extraction of the same can be made of advantage. The most valuable of these products is the methyl alcohol which can be obtained in a very pure state. Among other products present in the said liquid sulfureted hydrogen, mercaptans, organic sulfids, acetone, ammonia, amins may be mentioned, some of these products are, however, to be regarded as impurities. Such of the above mentioned products as contain sulfur are, of course, only obtained in factories where the so called sulfate method is employed and where the loss of alkali is compensated for by adding sodium sulfate to the lye, but not in factories where the so-called soda process is used and where the loss of alkali is compensated for in any other way, for instance by adding sodium carbonate to the lye.

The present invention consists in that the said liquid of condensation forming at present an inconvenient waste product is treated for recovering methyl alcohol (wood spirit) from the same by a process to be more particularly explained hereinafter and which is principally characterized by the fact that the liquid of condensation is exposed to fractional distillation and that the fractions are treated with chemicals, if necessary, and further distilled. The water remaining after the completion of the process is practically pure and may be discharged into a river or be employed within the factory. In the fractional distillation the organic sulfurous compounds are recovered as separate fractions. Ammonia and sulfureted hydrogen combine to form sulfid of ammonium and the methyl alcohol is obtained as a separate more or less pure fraction. This fraction is or may be cleaned by a systematic treatment with suitable chemicals, such as acids, bases, oxidizing agents, metal salts, etc. After this treatment the solution may be exposed to fractional distillation and rectification. The liquid may of course be treated with alkalis directly before being exposed to fractional distillation.

In order to make the process as economical as possible according to the present invention the heat of the vapors given off from the boiling lye during the process is obtained by condensation and utilized as a source of heat for conducting the distillation. This distillation may be performed in a column or other similar device, and the heating effect of the vapors may be applied either directly or indirectly, *i. e.*, the vapors may be driven directly through the liquid of condensation, which is to be distilled, whereby the volatile constitutents of the same are driven off with the said vapors, or the vapors may be led through heating coils or elements placed in the said liquid, whereby the vapors are condensed thereby giving off their heat to the surrounding liquid which is brought to the boiling temperature.

In order that the invention may be the better understood reference will be had to the accompanying drawings wherein—

Figure 1 is a diagrammatic view of an apparatus employed in conjunction with the process; and Fig. 2 is a view similar to Fig. 1, illustrating a further form of apparatus.

Below we have indicated a practical method of carrying out the present invention, reference being had to Fig. 1 of the accompanying drawing. The vapors escaping from the boiling lye contained in the boiler A are led through a condenser B in which one part of the vapors of the less volatile constituents are condensed by the cooling action of water led around the serpentine E. The liquid of condensation thereby formed is allowed to descend into the receptacle C where the same is penetrated by and subjected to the heating action of that part of the vapors which has not been condensed in the condenser B and which carry with them the more volatile constituents of the contents of the receptacle C. The vapors escaping from the receptacle C are finally condensed in the refrigerator D by the action of cooling water led around the serpentine F. In said refrigerator a more or less concentrated solution containing methyl alcohol is obtained, the degree of concentration of which depends on the quantity of methyl alcohol vapors concentrated in the receptacle C. The solution inclosed in the receptacle C is tapped off and may be distilled for the recovery of the small quantities of methyl alcohol contained in the same. The liquid coming from the refrigerator D, and liquid obtained by cooling directly the vapors escaping from the boiling lye, forms the raw material, in the manufacture of methyl alcohol according to the present invention. This solution is then introduced most suitably into a continually working column where it is concentrated further up to about 10-50% of alcohol. From this device a solution containing alcohol and having sometimes an oil floating thereon is obtained; this oil contains small quantities of methyl alcohol and is washed with water for removing the said alcohol, and then the washing water is mixed with the alcohol solution which is now distilled, for instance, in a periodically working column. The fraction containing the methyl alcohol is then, if necessary, treated with sulfuric acid for removing ammonia, and the sulfuric acid having been removed the said fraction may be treated with lead-acetate for removing mercaptans, and sulfureted hydrogen. These substances may of course be separated from the methyl alcohol by distillation. Instead of lead-acetate other heavy metallic salts which cause a precipitate with sulfureted hydrogen can also be used. If desired, the solution may then be treated with hydrate of calcium. The liquid can also be subjected to this treatment with chemicals before being exposed to fractional distillation.

In the form of apparatus shown in Fig. 2, the vapors coming from the boiler A are led by tube H through the coil G placed in a receptacle I filled with liquid of condensation, whereby said vapors are partly condensed. The liquid of condensation and the vapors not condensed in the coil G are led through the coil K surrounded by cooling water in the receptacle L whereby said vapors are condensed. The liquid of condensation flows into the receptacle M from which it is, by means of a pump N or the like, carried over through tube O into the receptacle I. The liquid in this receptacle is heated to boiling temperature by the vapors passing through the coil G, and the vapors thereby escaping from said liquid are condensed by being led through the coil R surrounded by cooling water in the receptacle P.

Having now described our invention, what we claim as new, and desire to secure by Letters Patent is:

1. The herein described method of producing methyl alcohol from waste products of the soda cellulose process, which consists in condensing the vapors formed in the boiler during certain stages of the process, fractionally distilling the liquid of condensation formed thereby, and treating the fractions containing methyl alcohol with chemicals adapted to remove the impurities, substantially as described.

2. The herein described method of producing methyl alcohol from waste products of the soda cellulose process, which consists in condensing the vapors formed in the boiler during certain stages of the process, fractionally distilling the liquid of condensation formed thereby by means of the vapors coming from the said boiler, and treating the fractions containing methyl alcohol with chemicals adapted to remove the impurities, substantially as described.

3. The herein described method of producing alcohol from waste products of the soda cellulose process, which consists in condensing the vapors formed in the boiler during certain stages of the process, treating the liquid of condensation with chemicals adapted to remove the impurities, fractionally distilling the said liquid of condensation and recovering the fraction containing methyl alcohol, substantially as described.

4. The herein described method of producing methyl alcohol (wood spirit) from waste products of the caustic soda cellulose process, which consists in condensing vapors escaping from the liquid boiling lye, and distilling the liquid of condensation formed thereby, and recovering the fraction or fractions containing methyl alcohol substantially as described.

5. The herein described method of producing methyl alcohol (wood spirit) from waste products of the caustic soda cellulose process, which consists in condensing vapors escaping from the liquid boiling lye, distilling the liquid of condensation formed thereby, recovering the fraction or fractions containing methyl alcohol, and treating said fraction or fractions with chemicals adapted to remove impurities, substantially as described.

6. The herein described method of producing methyl alcohol (wood spirit) from waste products of the caustic soda cellulose process, which consists in condensing vapors escaping from the liquid boiling lye, distilling the liquid of condensation formed thereby by means of the vapors coming from the said boiling lye, recovering the fraction or fractions containing methyl alcohol, and treating the said fraction or fractions containing methyl alcohol with chemicals adapted to remove the impurities, substantially as described.

7. The herein described method of producing methyl alcohol (wood spirit) from waste products of the caustic soda cellulose process, which consists in condensing vapors escaping from the liquid boiling lye, treating the liquid of condensation formed thereby with chemicals adapted to remove the impurities, distilling the said liquid of condensation, and recovering the fraction or fractions containing methyl alcohol, substantially as described.

8. The herein described method of producing methyl alcohol (wood spirit) from waste products of the caustic soda cellulose process, which consists in condensing vapors escaping from the liquid boiling lye, treating the liquid of condensation formed thereby with chemicals adapted to remove the impurities, distilling the said liquid of condensation, recovering the fraction or fractions containing methyl alcohol and treating the said fraction or fractions with chemicals adapted to remove the impurities, substantially as described.

9. The herein described method of producing methyl alcohol (wood spirit) from waste products of the caustic soda cellulose process, which consists in condensing vapors escaping from the liquid boiling lye, treating the liquid of condensation with chemicals adapted to remove the impurities, distilling the said liquid of condensation, recovering the fraction or fractions containing methyl alcohol, treating the said fraction or fractions with chemicals adapted to remove the impurities and distilling the liquid thus treated, substantially as described.

10. The herein described method of producing methyl alcohol (wood spirit) from waste products of the caustic soda cellulose process, which consists in condensing the vapors escaping from the liquid boiling lye, distilling the liquid of condensation formed thereby by means of vapors from the liquid boiling lye, and recovering the fraction or fractions containing methyl alcohol, substantially as described.

In witness whereof, we have hereunto signed our names in the presence of two subscribing witnesses.

HILDING OLOF VIDAR BERGSTRÖM.
KERSTIN MARIA FAGERLIND,
ERIK HJALMAR BERTIL ALMGREN,
*Representatives of Oscar Fagerlind, deceased.*

Witnesses:
TORVALD NYSTRÖM,
AXEL EHRNERF.